United States Patent
Takahashi et al.

(10) Patent No.: US 7,434,822 B2
(45) Date of Patent: Oct. 14, 2008

(54) FRAME STRUCTURE

(75) Inventors: Shinji Takahashi, Saitama (JP); Seiji Hanafusa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 408 days.

(21) Appl. No.: 11/231,889

(22) Filed: Sep. 22, 2005

(65) Prior Publication Data

US 2006/0066068 A1 Mar. 30, 2006

(30) Foreign Application Priority Data

Sep. 30, 2004 (JP) ............... 2004-289271

(51) Int. Cl.
 *B62D 21/11* (2006.01)
(52) U.S. Cl. .............. 280/124.109; 180/311; 280/781
(58) Field of Classification Search ........ 180/311, 180/312; 280/781, 124.109, 124.134, 124.135, 280/124.1
See application file for complete search history.

(56) References Cited

U.S. PATENT DOCUMENTS

| | | | |
|---|---|---|---|
| 4,650,210 A | 3/1987 | Hirose et al. | |
| 4,662,467 A * | 5/1987 | Arai et al. | 180/210 |
| 5,845,918 A | 12/1998 | Grinde et al. | |
| 5,954,364 A * | 9/1999 | Nechushtan | 280/781 |
| 6,085,857 A * | 7/2000 | Horiuchi | 180/292 |
| 6,264,241 B1 * | 7/2001 | Horiuchi | 280/781 |
| 6,286,619 B1 | 9/2001 | Uchiyama et al. | |
| 6,412,856 B1 * | 7/2002 | Kajikawa et al. | 296/203.01 |
| 6,799,781 B2 * | 10/2004 | Rasidescu et al. | 280/781 |
| 7,063,342 B2 * | 6/2006 | Seki | 280/124.134 |
| 7,303,051 B2 * | 12/2007 | Seki | 188/18 A |
| 7,306,069 B2 * | 12/2007 | Takeshima et al. | 180/312 |
| 2001/0048207 A1 | 12/2001 | Handa | |
| 2002/0117843 A1 | 8/2002 | Rasidescu et al. | |
| 2003/0121711 A1 | 7/2003 | Chiu | |
| 2005/0253353 A1 * | 11/2005 | Yamamura et al. | 280/124.135 |
| 2007/0176407 A1 * | 8/2007 | Tsuruta et al. | 280/788 |

FOREIGN PATENT DOCUMENTS

| | | |
|---|---|---|
| JP | 63-28706 A | 2/1988 |
| JP | 1-29194 Y2 | 9/1989 |
| JP | 2-28082 A | 1/1990 |
| JP | 2003-191881 A | 7/2003 |

* cited by examiner

*Primary Examiner*—Eric Culbreth
*Assistant Examiner*—Nicole Verley
(74) *Attorney, Agent, or Firm*—Birch, Stewart, Kolasch & Birch, LLP

(57) ABSTRACT

A frame structure provided for a body frame that can be used in common to vehicles with different types of rear suspensions. The frame structure includes a sub-frame assembly for an independent suspension type rear suspension that can be mounted to a body frame by using pivot brackets for supporting a swing arm provided in the body frame, and also using an upper mount for supporting a rear cushion provided in the body frame.

20 Claims, 13 Drawing Sheets

FRAME STRUCTURE

CROSS-REFERENCE TO RELATED APPLICATION

The present application claims priority under 35 U.S.C. §119 to Japanese Patent Application No. 2004-289271, filed Sep. 30, 2004, the entire contents of which are hereby incorporated by reference.

BACKGROUND OF THE INVENTION

1. Field of the Invention

The present invention relates to a frame structure in a saddle-ride vehicle having two or more rear wheels.

2. Description of Background Art

Heretofore there has been known vehicles of the above-mentioned type in which a swing arm type rear suspension is adopted (see, for example, Japanese Utility Model Publication No. Hei 1-29194).

There also have been known vehicles of the above-mentioned type in which an independent suspension type rear suspension is adopted. Vehicles having different types of rear suspensions usually must also have different types of body frame. However, from the standpoint of cost reduction would be desirable to have a construction which permits a common use of a body frame between vehicles having different rear suspensions.

SUMMARY AND OBJECTS OF THE INVENTION

For solving the above-mentioned problem, according to a first aspect of the present invention, a frame structure is provided in a saddle-ride vehicle, including a body frame (e.g., body frame 4 in an embodiment of the invention), the body frame including a front portion (e.g., front portion 4a in the embodiment) for suspending a front wheel (e.g., each front wheel 2 in the embodiment), a center portion (e.g., center portion 4b in the embodiment) for supporting an engine (e.g., engine 5 in the embodiment), and a rear portion (e.g., rear portion 4c in the embodiment) serving also as a seat rail, with a swing arm (e.g., swing arm 71 in the embodiment), which suspends at least two rear wheels (e.g., rear wheels 3 in the embodiment) being supported in the center portion, and with a rear cushion (e.g., rear cushion 72 in the embodiment) being supported in the center portion or the rear portion. A sub-frame (e.g., sub-frame assembly 140, 150 in the embodiment) for an independent suspension type rear suspension is attached to the body frame by utilizing a swing arm support portion (e.g., each pivot bracket 49 in the embodiment) provided in the center portion and a rear cushion support portion (e.g., upper mount 57a) provided in the center portion or the rear portion.

According to this construction, the body frame in a vehicle adopting a swing arm type rear suspension can also be used as the body frame in a vehicle adopting an independent suspension type rear suspension.

In this case, according to a second aspect of the present invention, if the sub-frame has a cushion mounting portion (e.g., frame-side mount 147a in the embodiment) for an independent suspension type rear cushion, a part for an independent suspension type rear suspension need not be provided beforehand in the body frame.

According to a third aspect of the present invention, a support portion (e.g., each side mount 151b in the embodiment) for the sub-frame is provided in a portion of the body frame different from the swing arm support portion and the rear cushion support portion.

According to this construction it is possible to enhance the mounting rigidity of the sub-frame relative to the body frame.

According to a fourth aspect of the present invention, if the support portion for the sub-frame is provided in a portion of the body frame located at a transversely outer position with respect to the rear cushion support portion, it becomes possible to effect stable mounting of the sub-frame even in the case where a cushion support portion for a swing arm type rear suspension is provided near the center of the vehicle body.

According to the first aspect of the present invention, the body frame can be used in common even between vehicles different in rear suspension type, whereby it is possible to reduce the cost of the body frame and hence of the vehicle.

According to the second aspect of the present invention, it is possible to suppress the occurrence of surplus parts in a common use of the body frame.

According to the third and fourth aspects of the present invention it is possible to enhance the mounting rigidity of the sub-frame relative to the body frame and hence the rigidity of the rear suspension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
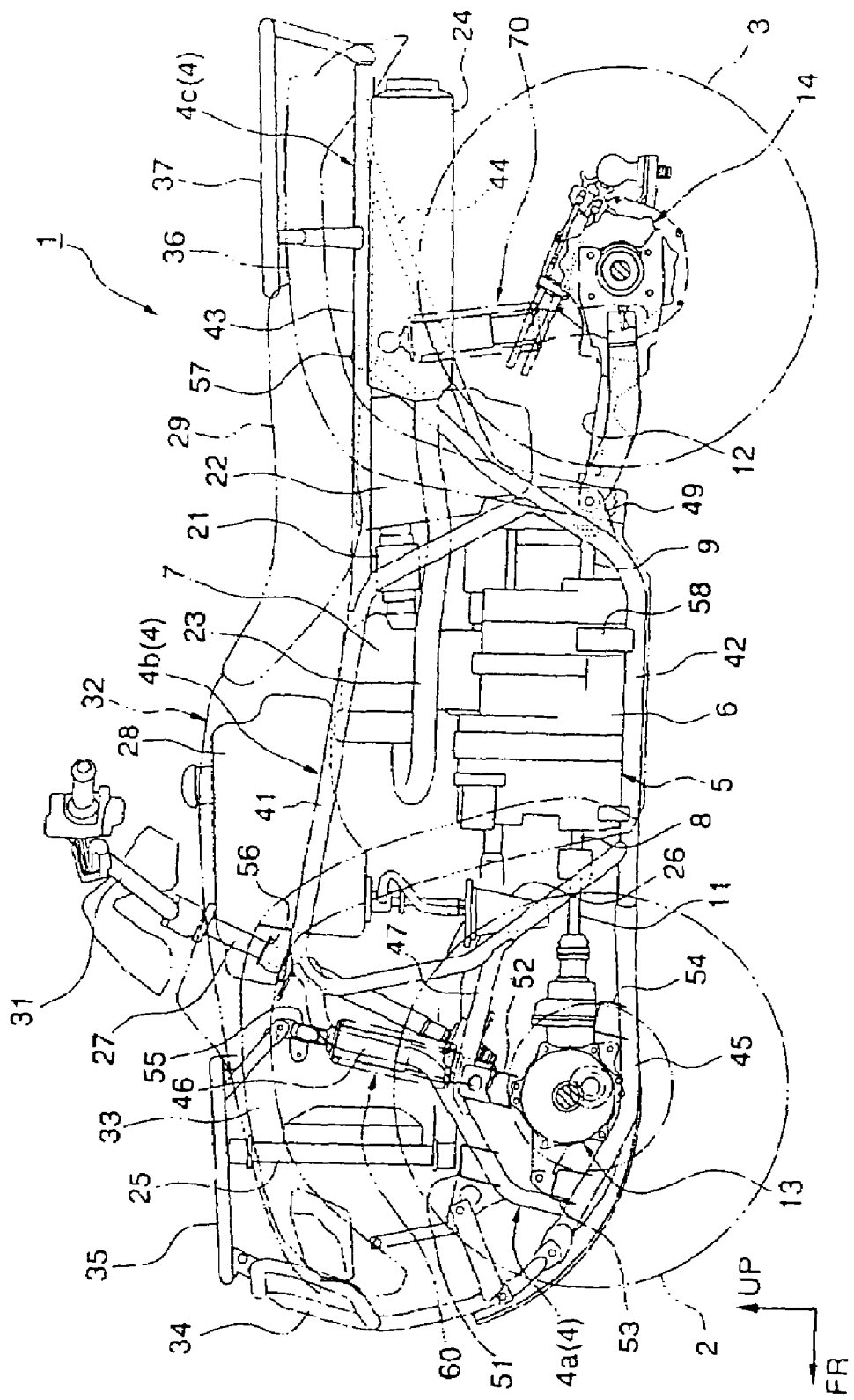
FIG. 1 is a side view of a saddle-ride four-wheeled vehicle to which the present invention is applied.

In the following description, the front, rear, right, and left directions are assumed to be the same directions in a vehicle concerned unless otherwise mentioned. In the drawings, the arrows FR, LH, and UP, represent the front side, left side, and upper side, respectively, of the vehicle.

A saddle-ride four-wheeled vehicle 1 shown in FIG. 1 is a so-called ATV (All Terrain Vehicle) including a vehicle body constructed in reduced size and weight, as well as front wheels 2 and rear wheels 3 as low-pressure balloon tires of a relatively large diameter disposed in front and rear positions and on right left sides of the vehicle. With such front and rear wheels, a large minimum ground clearance is ensured and the running-through performance mainly on uneven ground is improved. In a front portion 4a and a rear portion 4c of a body frame 4, the front wheels 2 and the rear wheels 3 are suspended respectively through a front suspension 60 and a rear suspension 70 which will be described in detail later.

An engine 5 as a prime mover in the saddle-ride four-wheeled vehicle 1 is mounted in a center portion (in other words, a nearly central portion of the vehicle body) 4b of the body frame 4. For example, the engine 5 is a water-cooled, single-cylinder, reciprocating engine mounted in a longitudinal layout in which a rotational axis of a crank shaft is disposed in the longitudinal direction of the vehicle. The engine 5 has a construction wherein a cylinder portion 7 is erected on a crank case 6. In front and rear portions of the crank case 6, a front output shaft 8 and a rear output shaft 9 are extended longitudinally forward and backward respectively from positions offset to the left side with respect to the transversely central portion of the vehicle body.

The output shafts 8 and 9 are connected to the front wheels 2 and the rear wheels 3 respectively through a front drive shaft 11 and a rear drive shaft 12 and further through a front final reduction gear unit 13 and a rear final reduction gear unit 14. Therefore, the output from the engine 5 is transmitted to the front wheels 2 and the rear wheels 3 through a transmission (not shown) accommodated within the crank case 6, then through the output shafts 8, 9 and further through the drive shafts 11, 12 and the final reduction gear units 13, 14.

Figure 2:
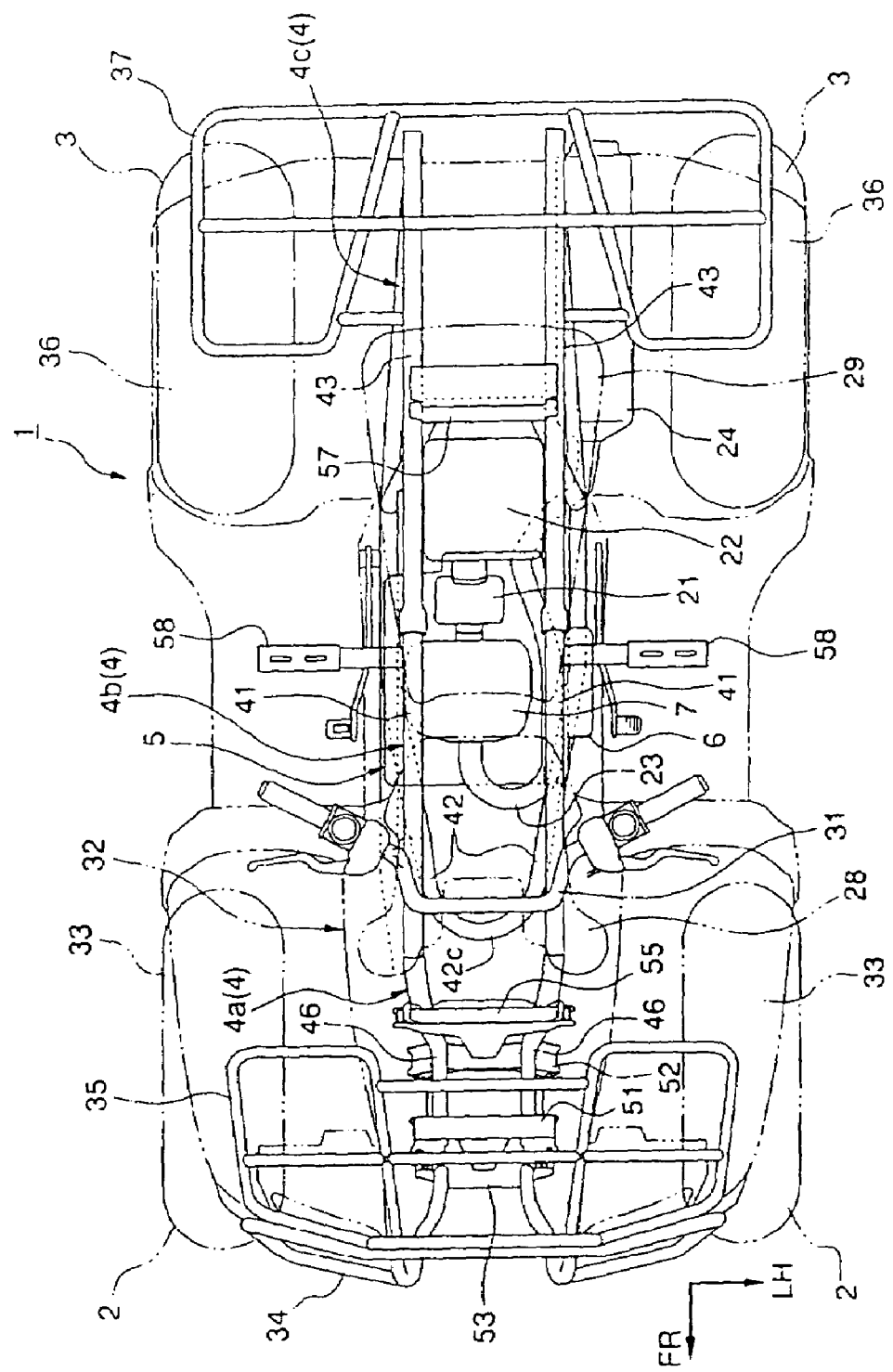
FIG. 2 is a top view of the saddle-ride four-wheeled vehicle.

Referring also to FIG. 2, a throttle body 21 is connected to the rear of the cylinder portion 7 of the engine 5 and an air cleaner case 22 is connected to the rear of the throttle body 21. Further, a base end portion of an exhaust pipe 23 is connected to the front of the cylinder portion 7. The exhaust pipe 23 extends ahead of the cylinder portion 7, then turns backward while passing the left side of the cylinder portion 7, and a front end portion thereof is connected to a muffler 24 disposed in the rear portion of the vehicle body. In FIG. 1, the numeral 25 denotes a radiator for cooling the engine 5 and numeral 26 denotes a fuel pump for feeding fuel under pressure to an injector (not shown).

In the transversely central portion of the body of the saddle-ride four-wheeled vehicle 1, a steering shaft 27, a fuel tank 28, and a saddle-ride seat 29 are disposed in this order from the front side. A lower end portion of the steering shaft 27 is connected to a front wheel steering mechanism (not shown) and a handlebar 31 is mounted to an upper end portion of the steering shaft 27.

A body cover 32 made of resin and covering the front portion of the vehicle body, front fenders 33 also made of resin and covering the front wheels 2 from above to back, a front protector 34 and a front carrier 35 both formed mainly of steel are mounted to the front portion of the body frame 4. Likewise, rear fenders 36 made of resin and covering the rear wheels 3 from above to back and a rear carrier 37 formed mainly of steel are mounted to the rear portion of the body frame 4.

Figure 3:
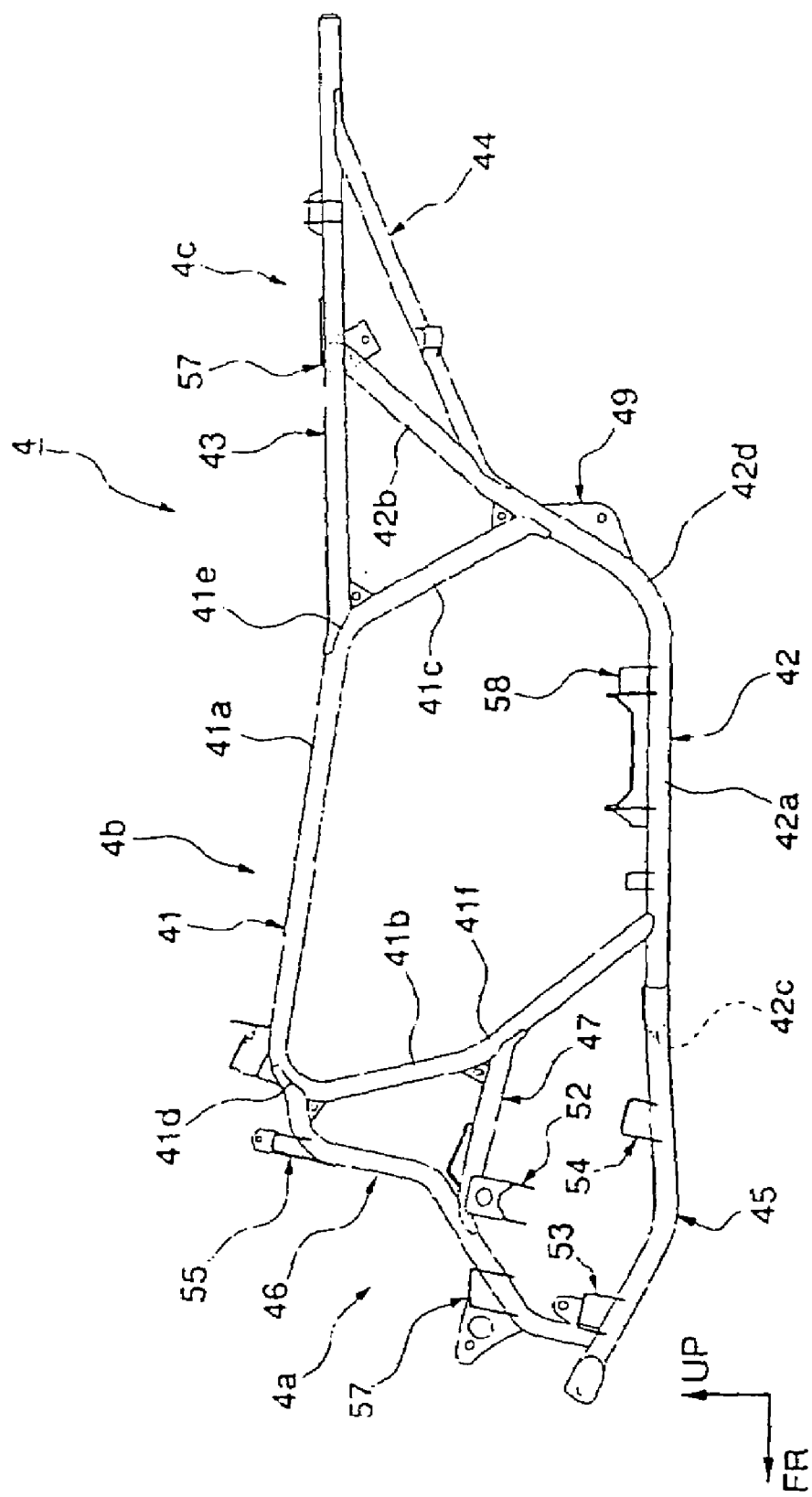
FIG. 3 is a side view of a body frame in the saddle-ride four-wheeled vehicle.

Referring also to FIG. 3, the body frame 4 is formed by joining plural steel members integrally by welding for example. More specifically, a suitable closed loop structure is formed using right and left upper pipes 41 and lower pipes 42 and those pipes are connected together through plural cross members to form a longitudinally long box structure in the transversely central portion of the vehicle body. The portion constituted mainly by the upper pipes 41 and the lower pipes 42 is here designated as the center portion 4b of the body frame 4.

Each upper frame 41 includes an upper inclined portion 41a, which is inclined somewhat backwardly downward at an upper outer position of the body frame 4, a front inclined portion 41b extending obliquely backward and downward from a front end of the upper inclined portion 41a at an acute angle relative to the front end, and a rear inclined portion 41c extending obliquely backward and downward from a rear end portion of the upper inclined portion 41a at an obtuse angle relative to the rear end. The inclined portions 41a, 41b, and 41c are formed integrally by bending a single steel pipe. In the following description, the bent portion between the upper inclined portion 41a and the front inclined portion 41b in each upper pipe 41 will be referred to as a front bent portion 41d, and the bent portion between the upper inclined portion 41a and the rear inclined portion 41c will be referred to as a rear bent portion 41e. Further, a forwardly projected bent portion formed at an approximately central position of the front inclined portion 41b will be referred to as a middle bent portion 41f.

Each lower pipe 42 includes a lower horizontal portion 42a disposed nearly horizontally at a lower outer position of the body frame 4 and a rear inclined portion 42b extending obliquely backward and upward from a rear end of the lower horizontal portion 42a at an obtuse angle relative to the rear end. The lower horizontal portion 42a and the rear inclined portion 42b are formed integrally by bending a single steep pipe. The right and left lower pipes 42 are provided so that their front ends are connected to each other through an arcuate portion 42c (see FIG. 2) which is projected forwardly when seen in top view of the vehicle body. That is, the right and left lower pipes 42 are provided so as to be an integral structure. In the following description, the bent portion between the lower horizontal portion 42a and the rear inclined portion 42b in each lower pipe will be designated a lower bent portion 42d.

The front inclined portion 41b of each upper pipe 41 is joined at its lower end to near a front end of the lower horizontal portion 42a of the lower pipe 42 located on the same side. The rear inclined portion 41c of each upper pipe 41 is joined at its lower end to a nearly central position in the longitudinal direction of the rear inclined portion 42b of the lower pipe 42 located on the same side. Longitudinally flat, generally triangular, right and left pivot brackets (swing arm support portions) 49 are integrally provided on lower rear sides of the rear inclined portions 41c of the right and left upper pipes 41. Each pivot bracket 49 is for supporting a front end portion of a swing arm 71 in a rear suspension 70.

Front ends of nearly horizontally disposed right and left rear upper pipes 43 serving as seat rails are joined respectively to the rear bent portions 41e of the right and left upper pipes 41. To a nearly central position in the longitudinal direction of each rear upper pipe 43 is joined an upper end of the rear inclined portion 42b of the lower pipe 42 located on the same side. Right and left rear sub-pipes 44, which are inclined backwardly upward, are mounted bridgewise between nearly central positions in the longitudinal direction of the rear inclined portions 42b of the right and left lower pipes 42 and the associated rear upper pipes 43. The portion constituted mainly by the rear upper pipes 43 and the rear sub-pipes 44 is here designated the rear portion 4c of the body frame 4. Further, a rear cross pipe 57 is bridgewise mounted as a cross member between nearly central positions in the longitudinal direction of the right and left rear upper pipes 43.

Rear ends of right and left front lower pipes 45, which are disposed nearly horizontally, are joined to the lower horizontal portions 42a of the lower pipes 42 in the vicinity of the front ends of the lower horizontal portions 42a. The front lower pipes 45 are bent obliquely upward and forward at positions near axles of the front wheels 2 in side view of the vehicle body and their front ends support a lower end portion of the front protector 34. Numeral 58 denotes a step for a rider, and a step board extending to both front fender 33 and rear fender 36 is attached to the step 58.

Upper ends of right and left front cushion pipes 46 extending from the bent portions 41d of the right and left upper pipes 41 to near the front ends of the associated front lower pipes 45 are joined to the front bent portions 41d. Each front cushion pipe 46 extends forward from the upper bent portion 41d of the upper pipe 41 located on the same side, then soon bends obliquely forward and downward, further bends in a gentle crank shape so that its lower portion is positioned on the front side relative to its upper portion, and its lower end is joined to near the front end of the front lower pipe 45 located on the same side. Right and left front sub-pipes 47, which are inclined somewhat forwardly upward, are mounted bridgewise between nearly central positions in the vertical direction of the right and left front cushion pipes 46 and the middle bent portions 41f of the associated upper pipes 41.

A middle front cross beam 51 and an upper central cross beam 55 both extending in the transverse direction are mounted bridgewise between the right and left front cushion pipes 46. Likewise, a lower front cross beam 53 and a lower rear cross beam 54 are mounted bridgewise between the right and left front lower pipes 45, and a middle rear cross beam 52 is mounted bridgewise between the right and left front sub-pipes 47. The portion constituted mainly by the front lower pipes 45, front cushion pipes 46, front sub-pipes 47, and cross beams 51 to 55 is here designated the front portion 4a of the body frame 4.

Figure 4:
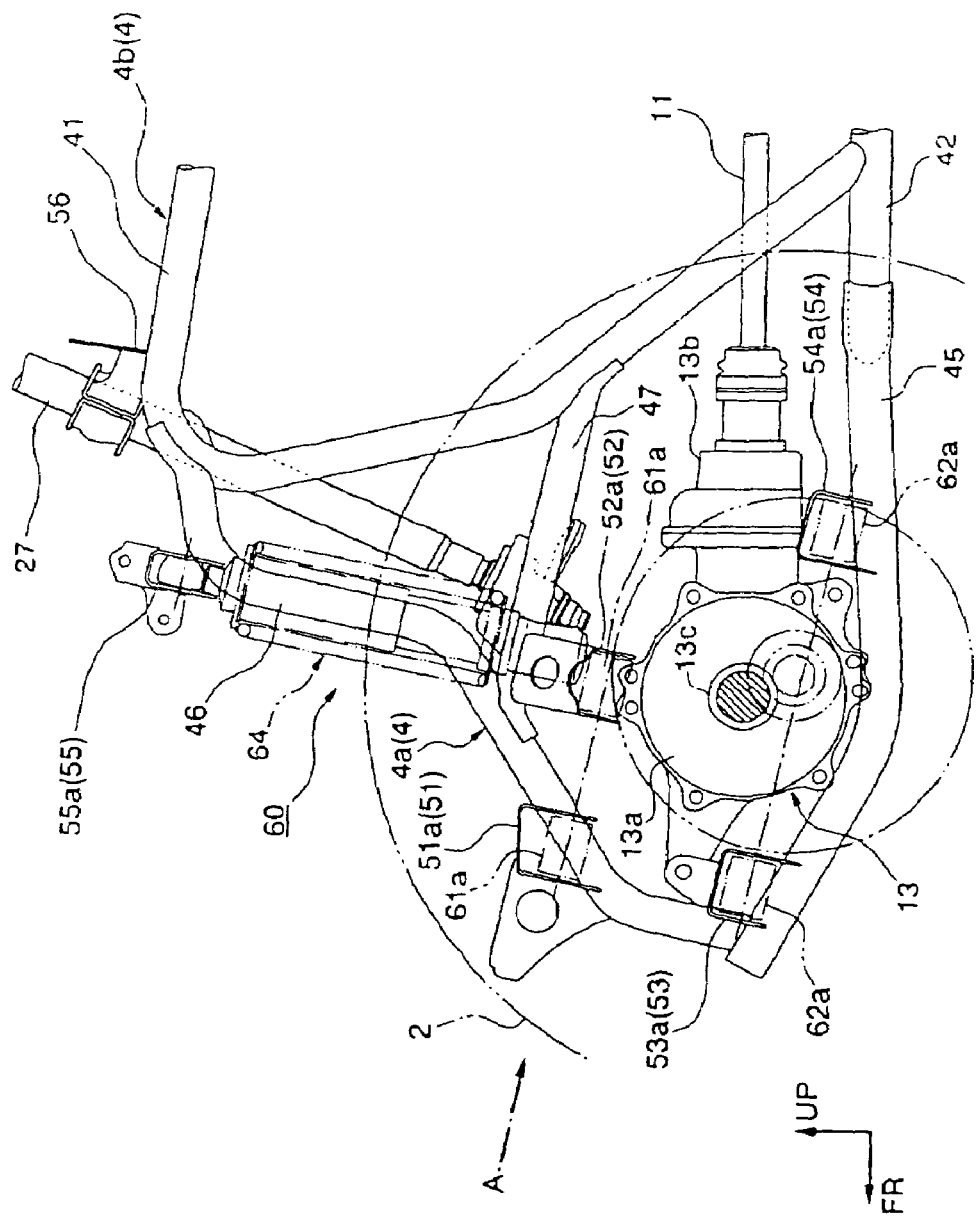
FIG. 4 is a side view of a front suspension in the saddle-ride four-wheeled vehicle.
Figure 5:
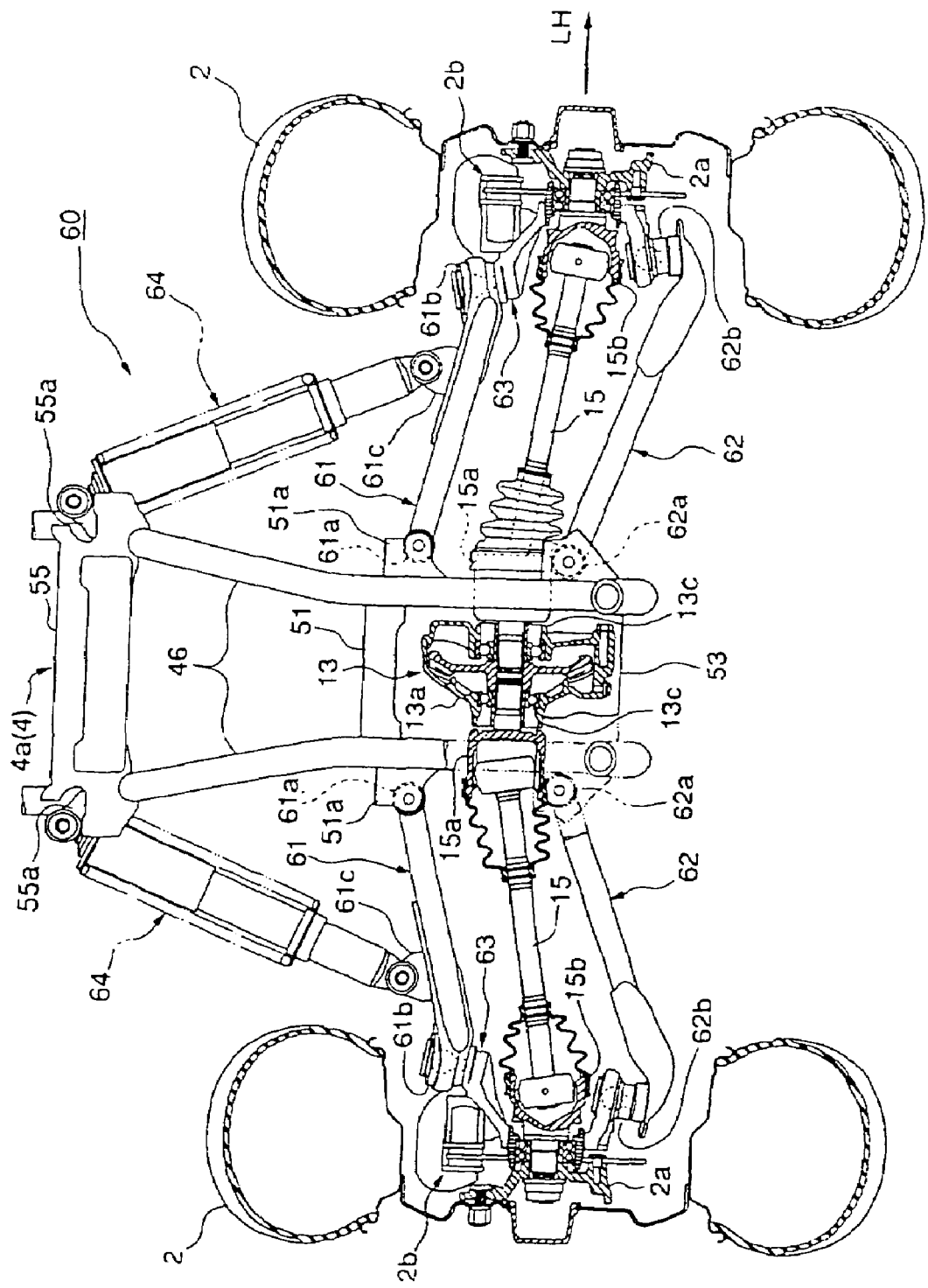
FIG. 5 is a view as seen in the direction of arrow A in FIG. 4.

As shown in FIGS. 4 and 5, a front suspension 60, which is supported in the front portion 4a of the body frame 4, is constituted as a so-called double wishbone type. More specifically, the front suspension 60 mainly includes right and left upper arms 61 and lower arms 62, the upper and lower arms 61, 62 being supported vertically swingably at their base ends by the body frame 4, right and left knuckles 63 supported on front end sides of the upper arms 61 and the lower arms 62, and right and left front cushion units 64 interposed between the lower arms 62 and the body frame 4.

The upper arms 61 and the lower arms 62 are each in a generally V shape branching from the knuckles 63 (front end side) toward the body frame 4 (base end side) in top view. At the branch ends there are integrally provided short pipe-like frame connecting portions 61a and 62a which are inclined backwardly downward. The frame connecting portions 61a and 62a are provided mutually in parallel so as to each share a central axis with each of the upper and lower arms 61, 62.

On the other hand, arm connecting portions 51a and 52a corresponding to the front and rear frame connecting portions 61a of the upper arms 61 are provided at both side portions of the middle front and rear cross beams 51, 52. Likewise, arm connecting portions 53a and 54a corresponding to the front and rear frame connecting portions 62a of the lower arms 62 are provided at both side portions of the lower front and rear cross beams 53, 54.

To the arm connecting portions 51a to 54a are connected the frame connecting portions 61a and 62a of the corresponding upper arms 61 and lower arms 62 with use of pivot shafts (e.g., shoulder bolts) extending through those frame connecting portions along the central axes. In this state the frame connecting portions 61a and 62a are supported by the arm connecting portions 51a to 54a rotatably through the pivot shafts and bearings disposed around outer peripheries of the pivot shafts. That is, the upper arms 61 and the lower arms 62 are pivotably supported in the front portion 4a of the body frame 4.

Upper or lower portions of the knuckles 63 are connected to the front ends of the upper arms 61 and the lower arms 62 through ball joints 61b and 62b. Hub portions 2a of the front wheels 2 are rotatably supported by the knuckles 63 respectively. A disc brake unit 2b as a front wheel brake is disposed outside each knuckle 63 and within the wheel of the associated front wheel 2.

Upwardly projecting arm-side mounts 61c are provided respectively in rear portions of the upper arms 61. Lower ends of the front cushion units 64 are connected respectively to the arm-side mounts 61c through connecting shafts (e.g., shoulder bolts) extending through those connected portions. In this state, the lower end portions of the front cushion units 64 are supported respectively by the arm-side mounts 61c, i.e., the upper arms 61, through bearings installed within the lower end portions and the connecting shafts.

Frame-side mounts 55a are provided in both side portions of the upper central cross beam 55. Upper ends of the front cushion units 64 are connected respectively to the frame-side mounts 55a through connecting shafts (e.g., shoulder bolts) extending through those connected portions. In this state, the upper end portions of the front cushion units 64 are supported by the frame-side mounts 55a, i.e., the body frame 4, through bearings installed within the upper end portions and the connecting shafts.

According to such a construction, when an impact load or the like is inputted to the front wheels 2 from the road surface, the front wheels pivot up and down each independently through the associated upper arms 61 and lower arms 62, causing the front cushion units 64 to expand and contract, so that the load is absorbed gently by a buffer action of the front cushion units 64.

A casing 13a of the front final reduction gear unit 13 is integrally joined to a nearly central position in the front portion 4a of the body frame 4 with use of bolts or the like. A front end portion of the drive shaft 11 is joined to an input portion 13b of the front final reduction gear unit 13. The final reduction gear unit 13 functions as a differential mechanism which not only changes the rotational direction of the driving force of the drive shaft 11 but also adjusts the distribution of the driving force to the right and left front wheels 2.

Right and left inner universal joints 15a are disposed outside and sideways of the front final reduction gear unit 13 and connecting rods extending from the inner universal joints 15a are connected respectively to right and left output portions 13c of the front final reduction gear unit 13. On the other hand, right and left outer universal joints 15b are disposed inside and sideways of the knuckles 63 and connecting rods extending from the outer universal joints 15b are connected to the hub portions 2a of the front wheels 2.

Right and left drive shafts 15 are mounted bridgewise between the inner universal joints 15a and the outer universal joints 15*b*. That is, inner ends of the drive shafts 15 are connected respectively to the output portions 13*c* of the front final reduction gear 13 through the corresponding inner universal joints 15*a*, while outer ends of the drive shafts 15 are connected respectively to the hub portions 2*a* of the front wheels 2 through the outer universal joints 15*b*.

The driving force of the engine 5 outputted to the output shaft 8 is transmitted to the front wheels 2 through the front drive shaft 11, front final reduction gear unit 13, inner universal joints 15*a*, drive shafts 15, and outer universal joints 15*b*.

Figure 6:
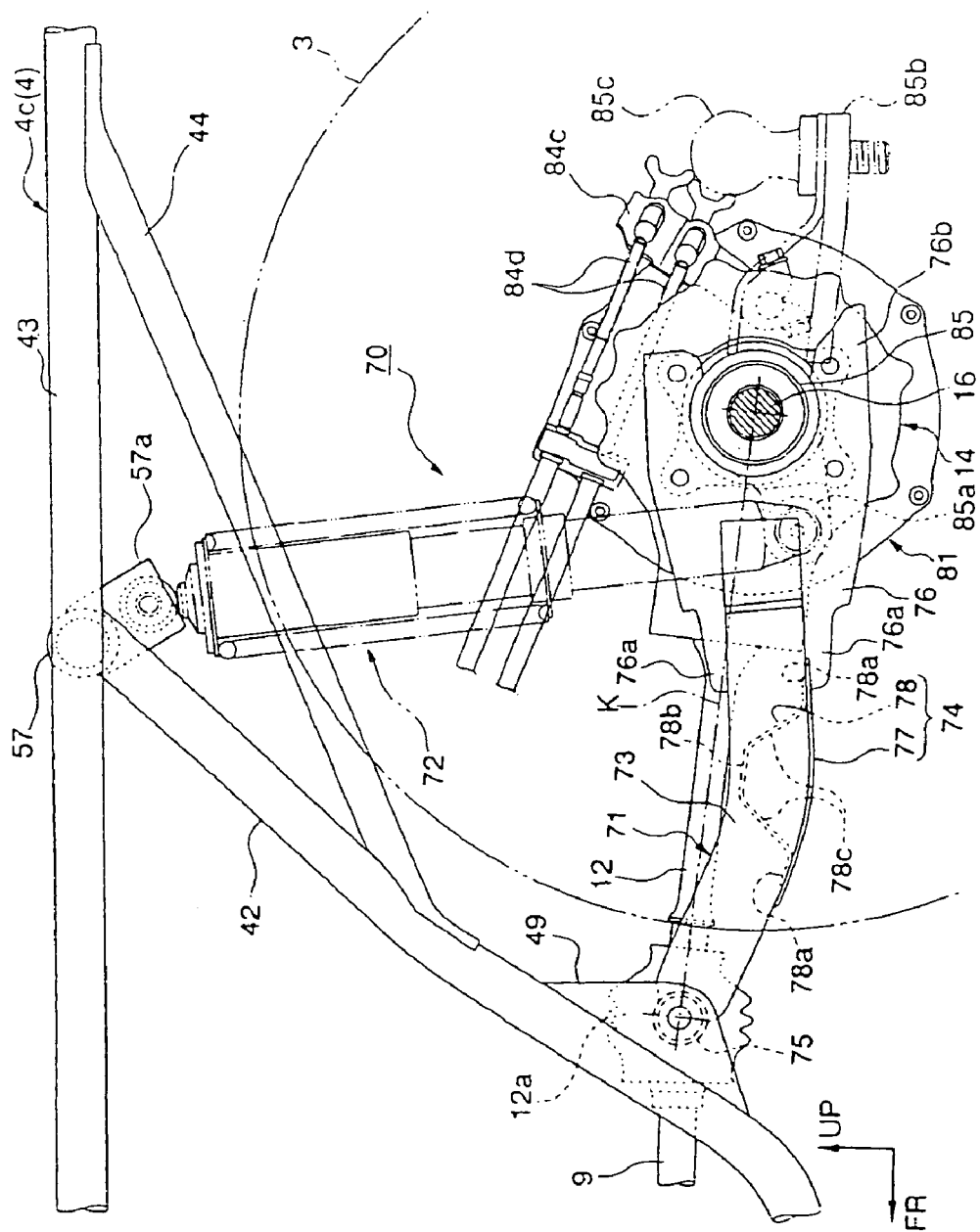
FIG. 6 is a side view of a swing arm type rear suspension in the saddle-ride four-wheeled vehicle.
Figure 7:
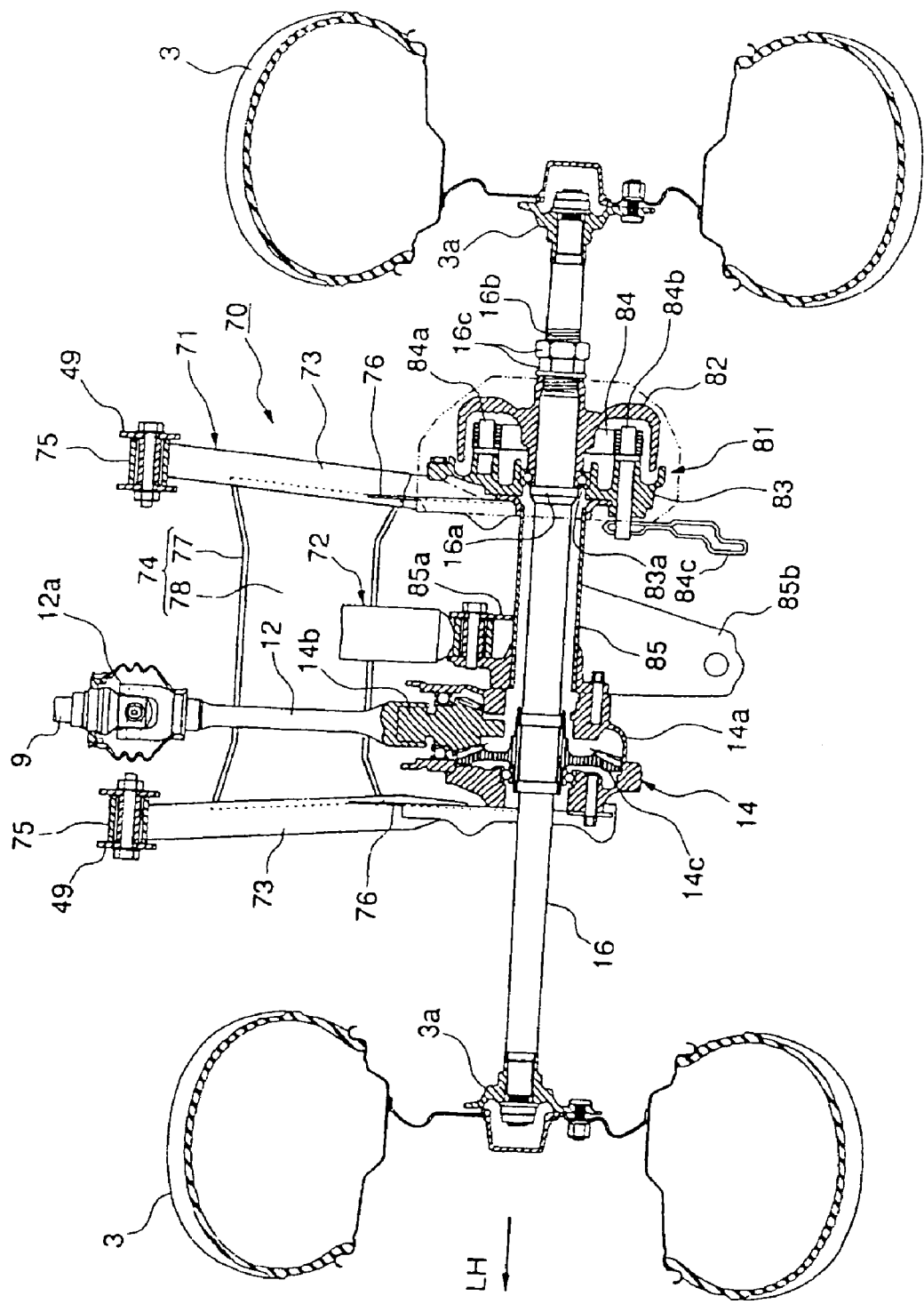
FIG. 7 is an explanatory top view of the swing arm type rear suspension.

As shown in FIGS. 6 and 7, the rear suspension 70, which suspends the rear wheels 3, mainly includes the swing arm 71 and a rear cushion unit 72. The front end portion of the swing arm 71 is supported vertically pivotably by pivot brackets 49, while a rear end portion thereof supports rotatably a rear axle shaft 16 extending between the hub portions 3*a* of the rear wheels 3. The swing arm 71 thus constructed is disposed so that the greater part except the front end portion thereof is positioned between both rear wheels 3.

The rear cushion unit 72 is disposed nearly centrally in the transverse direction of the vehicle body and is inclined in such a manner that the higher the position thereof, the more front the position thereof. A lower end of the rear cushion unit 72 is connected to near the rear end portion of the swing arm 71. An upper end of the rear cushion unit 72 is connected to the rear cross pipe 57 in the body frame 4. According to such a construction, when an impact load or the like is inputted to the rear wheels 3 from the road surface, both rear wheels 3 pivot up and down through the swing arm 71, causing the rear cushion unit 72 to expand and contract, and the impact load is absorbed gently by a buffer action of the rear cushion unit 72.

The swing arm 71 includes right and left arm members 73 extending longitudinally, a cross member 74 extending bridgewise between the arm members 73, right and left pivot connections 75 provided respectively at front end portions of the arm members 73, and right and left support plates 76 provided respectively at rear end portions of the arm members 73. These components are joined together by welding for example. The swing arm 71 is disposed substantially symmetrically right and left with respect to the center of the vehicle body.

The arm members 73 are bent nearly centrally in the longitudinal direction so as to be projected downwardly and are formed so as to be tapered at their front end portions in side view. Further, the rear end portions of the arm members 73 are tapered relatively gently in top view. The arm members 73 are somewhat inclined in top view of the vehicle body in such a manner that the rearer the position thereof, the shorter the distance between the two.

Each pivot connection 75 is a short pipe-like portion extending in the transverse direction and the front end portion of the arm member 73 located on the same side is joined to a rear portion the pivot connection 75.

Each support plate 76 is a thick plate extending along a side face of the vehicle body and a pair of upper and lower projecting portions 76*a* are formed at a front portion of the support plate 76 so as to sandwich the rear end portion of the associated arm member 73 in between the projecting portions 76*a*. Each support plate 76 and the associated arm member 73 are joined together in a state in which the rear end portion of the arm member 73 is fitted in the front portion of the support plate 76. Further, each support plate 76 is provided at the rear portion thereof with a generally U-shaped support portion 76*b* which is open backward so as to support the rear axle shaft 16.

The cross member 74 extends substantially linearly in the transverse direction and is mounted bridgewise between the bent portions of both arm members 73. Both side portions of the cross member 74 are tapered so as to be divergent in top view to not only prolong the length of connection between the both side portions and the arm members 73 but also mitigate stress concentration.

The cross member 74 includes a plate member 77 having an arcuate section along lower side portions of the arm members 73 in side view of the vehicle body and a hat-shaped member 78 having a generally hat-shaped section which is projected upwardly in side view of the vehicle body. The plate member 77 and the hat-shaped member 78 are joined integrally by welding in a state in which front and rear lower-side portions 78*a* of the hat-shaped member 78 are superimposed on the plate member 77 from above.

Front and rear rising wall portions 78*c* extending between an upper-side portion 78*b* and the lower-side portions 78*a* of the hat-shaped member 78 are inclined so that the lower (the plate member 77 side) the position thereof, the longer the mutual distance. A longitudinal width of the plate member 77 is set larger than that of the hat-shaped member 78, whereby not only a longitudinal width of a bottom (the plate member 77) of the cross member 74 is made sufficiently larger than that of an upper portion (the upper-side portion 78*b* of the hat-shaped member 78) of the cross member 74, but also an internal space having a generally trapezoid shape is formed within the cross member 74.

Besides, the cross member 74 is disposed so that, in side view of the vehicle body, the bottom thereof runs along lower-side portions of the arm members 73 and the upper potion thereof is positioned lower than upper side portions of the arm members 73. That is, a vertical width of the cross member 74 is set narrower than that of each arm member 73. Therefore, in side view of the vehicle body, the cross member 74 does not project vertically from the arm members 73.

If a line joining the pivot center of the swing arm 71 and the axis of the rear axle shaft 16 in side view of the vehicle body is assumed to be an arm reference line K, the cross member 74 is offset downward with respect to the arm reference line K. The rear drive shaft 12 is disposed so that the axis thereof overlaps the arm reference line K in side view of the vehicle body. Therefore, a sufficient vertical clearance is ensured between the rear drive shaft 12 and the cross member 74.

The pivot connections 75 are connected to the corresponding pivot brackets 49 with use of pivot shafts (e.g., shoulder bolts) extending transversely through those components. In this state, the pivot connections 75 are supported by the pivot brackets 49 rotatably through the pivot shafts and bearings disposed on outer peripheries of the pivot shafts. That is, the front end portion of the swing arm 71 is supported swingably by the body frame 4.

The rear final reduction gear unit 14 for converting the driving force provided from the rear drive shaft 12 into the driving force of the rear axle shaft 16 is secured to the left support plate 76. On the other hand, a drum brake unit 81 as a rear wheel brake is secured to the right support plate 76. The rear axle shaft 16 is supported rotatably by the rear end portion of the swing arm 71 through the rear final reduction gear unit 14 and the drum brake unit 81.

The rear final reduction gear unit 14 is offset to the left side of the vehicle body correspondingly to the rear output shaft 9 of the engine 5. A front end of the rear drive shaft 12 is connected to a rear end of the rear output shaft 9 through a universal joint 12*a*. The universal joint 12*a* is disposed so that its movement center is positioned on the pivot center. A rear end of the rear drive shaft 12 is connected to an input-side bevel gear 14b in the rear final reduction gear unit 14.

The bevel gear 14b, together with a bevel gear 14c of a larger diameter meshing with the bevel gear 14b, is supported rotatably within a casing 14a of the rear final reduction gear unit 14. The bevel gear 14c of a larger diameter is disposed coaxially with the rear axle shaft 16 and a hub portion thereof is splined to the rear axle shaft 16, which extends through the hub portion.

The casing 14a is integrally joined to the associated support plate 76 with bolts or the like in such a manner its left side face is put in abutment against the right side face of the support plate 76. In this way the rear axle shaft 16 is supported at the rear end portion of the left arm member 73 rotatably through the rear final reduction gear unit 14.

The driving force of the engine 5 outputted to the rear output shaft 9 is transmitted to the rear wheels 3 through the universal joint 12a, rear drive shaft 12, rear final reduction gear unit 14, and rear axle shaft 16.

The drum brake unit 81 includes a brake drum 82, which is open leftward, and a brake base 83, which is disposed opposedly on the left side of the brake drum 82.

The brake drum 82 is disposed coaxially with the rear axle shaft 16 and a hub portion thereof is splined to the rear axle shaft 16, which extends through the hub portion.

The brake base 83 is integrally joined to the associated support plate 76 with bolts or the like in such a manner that its left side face is put in abutment against the right side face of the support plate 76. The brake base 83 is supported rotatably through a ball bearing 83a onto the rear axle shaft 16, which extends through a hub portion of the brake base.

In the brake base 83, a pair of brake shoes 84 are supported so that they can come into frictional contact with an inner periphery of the brake drum 82. More specifically, in the brake base 83, anchor pins 84a serving as support shafts for the brake shoes 84 are erected, and a cam shaft 84b for expanding each brake shoe 84 is supported pivotably. An operating lever 84c is attached by serration-fitting to a front end portion of the cam shaft 84b and is operated through cable 84d by operation of a brake operating member (not shown), whereby the cam shaft 84b pivots and the brake shoes 84 expand and come into frictional contact with the inner periphery of the brake drum 82.

A right side face of an annular projection 16a formed on the outer periphery of the rear axle shaft 16 is put in abutment against a left side face of an inner race of the ball bearing 83a, while a left side face of the hub portion of the brake drum 82 is put in abutment against a right side face of the inner race. A portion of the rear axle shaft 16 positioned near the right end of the drum brake unit 81 is formed as a threaded portion 16b having threads on the outer periphery thereof. Two nuts 16c are brought into threaded engagement with the threaded portion 16b to fix the drum brake unit 81 in a double nut fashion, whereby the position of the drum brake unit 81 and that of the rear axle shaft 16 in the transverse direction relative to the swing arm 71 (the right arm member 73) is defined.

A transversely extending cylindrical axle housing 85 is disposed between the drum brake unit 81 and the rear final reduction gear unit 14. The axle housing 85 is for insertion through the interior thereof of the rear axle shaft 16 and a left side face of a left-end flange portion thereof is put in abutment against a right side face of the casing 14a of the rear final reduction gear unit 14 and is joined integrally in this state to the casing right side face using bolts or the like. A right-end flange portion of the axle housing 85 is put in abutment against a left side face of the brake base 83 of the drum brake unit 81. That is, the axle housing 85 functions also as a distance collar between the drum brake unit 81 and the rear final reduction gear unit 14.

A lower mount 85a projecting obliquely downward and forward is provided at a nearly central position in the transverse direction of the axle housing 85. The lower end of the rear cushion unit 72 is connected to the lower mount 85a with use of a connecting shaft (e.g., a shoulder bolt) which extends through the lower mount in the transverse direction. On the other hand, an upper mount (rear cushion support portion) 57a (see FIG. 9) is provided at a nearly central position in the transverse direction of the rear cross pipe 57 of the body frame 4 and the upper end of the rear cushion unit 72 is connected to the upper mount 57a also using a transversely extending connecting shaft (e.g., a shoulder bolt). At a nearly central position in the transverse direction of the axle housing 85, a so-called trailer hitch is constituted mainly by a backwardly extending mounting bracket 85b and a hitch ball 85c supported by the mounting bracket.

Figure 8:
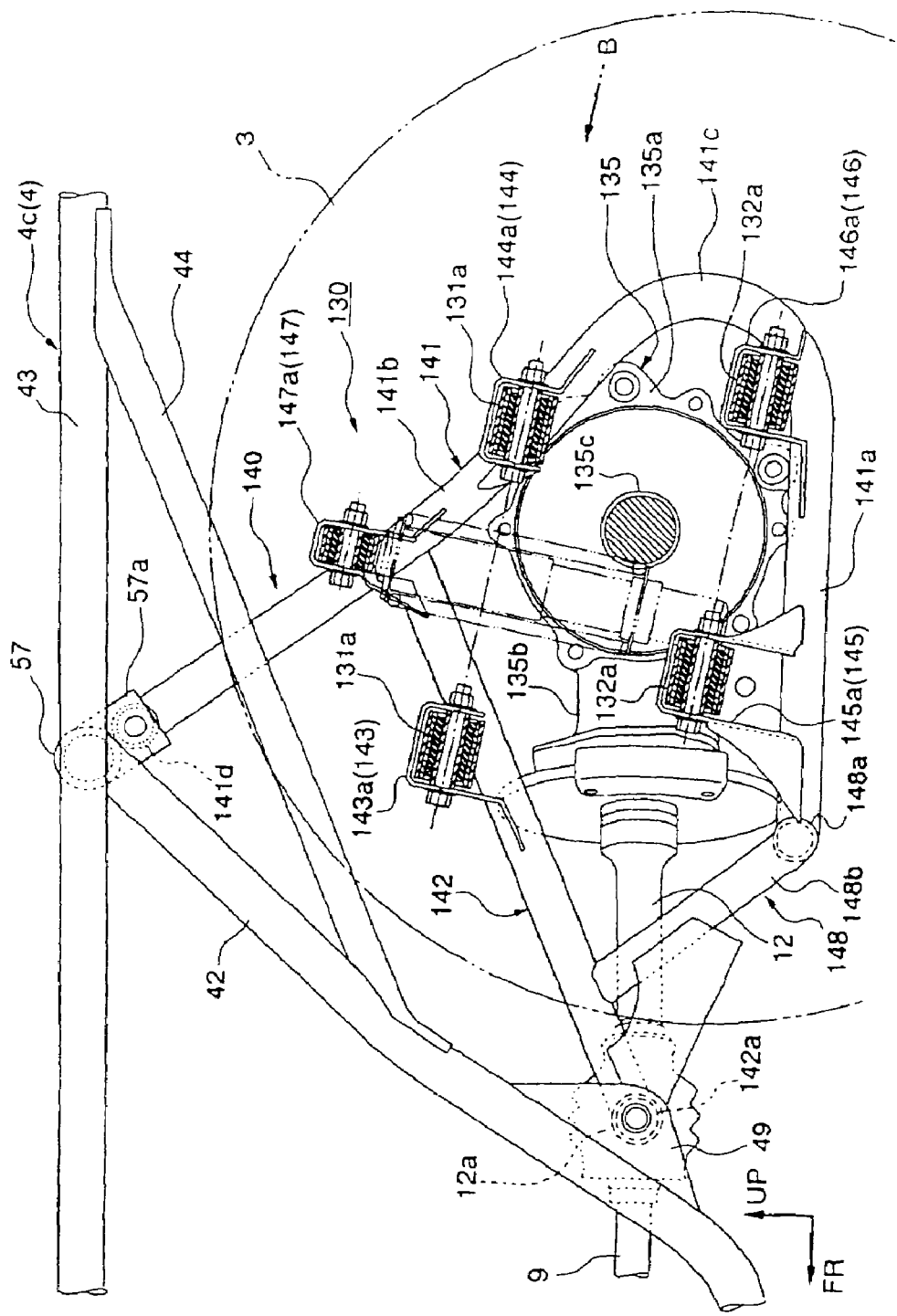
FIG. 8 is a side view of an independent suspension type rear suspension in the saddle-ride four-wheeled vehicle.
Figure 9:
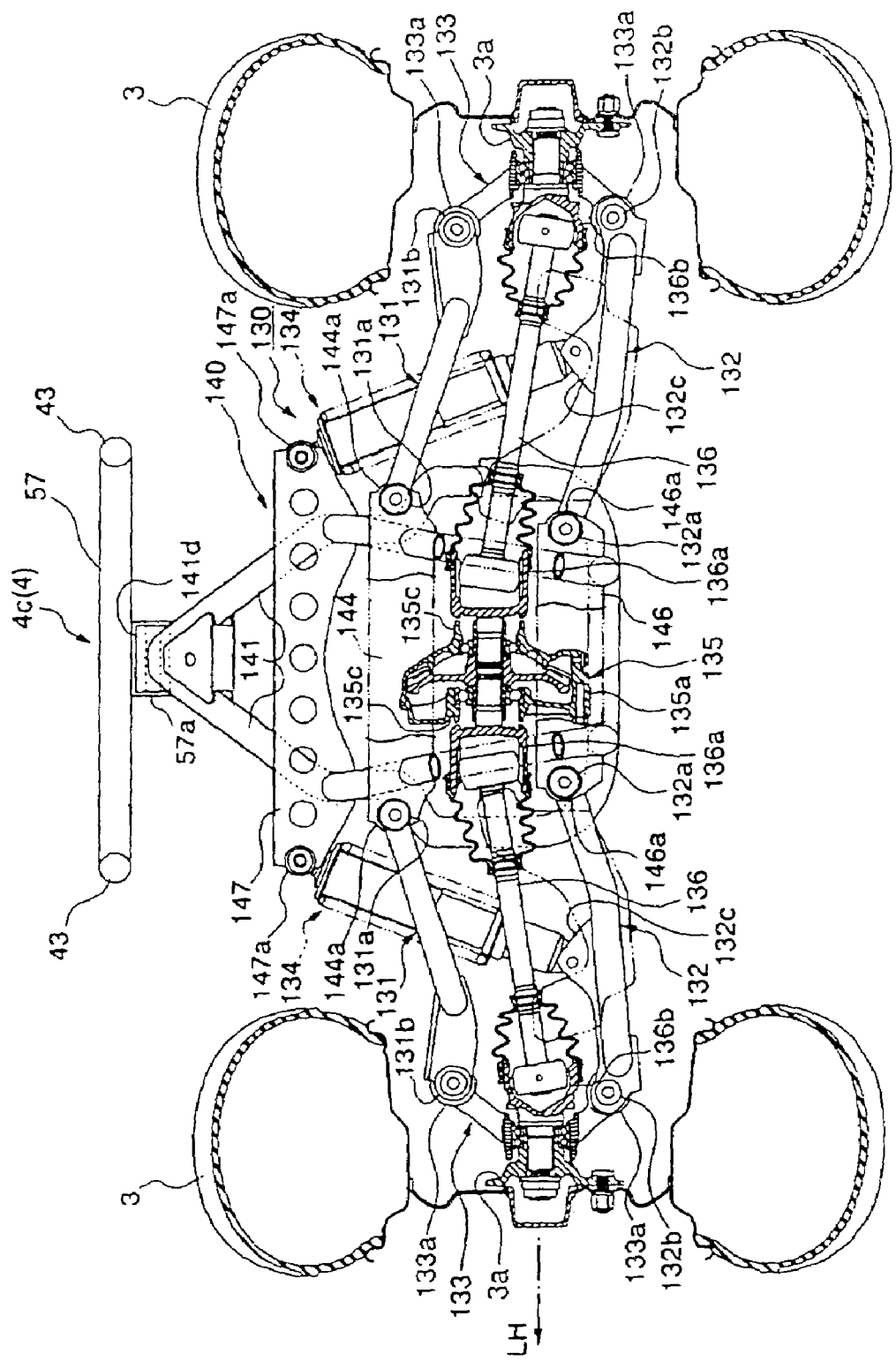
FIG. 9 is a view as seen in the direction of arrow B in FIG. 8.

In the saddle-ride four-wheeled vehicle 1, as shown in FIGS. 8 and 9, the above swing arm type rear suspension 70 can be substituted by an independent suspension type rear suspension 130.

The rear suspension 130 is supported by a sub-frame assembly (assembly) 140, which is integrally mounted to the body frame 4 and is constituted as a so-called double wishbone type. More specifically, the rear suspension 130 mainly includes right and left upper arms 131 and lower arms 132, right and left knuckles 133, and right and left rear cushion units 134. The upper and lower arms 131, 132 are supported at base ends thereof by the sub-frame assembly 140 vertically pivotably. The right and left knuckles 133 are supported at front ends of the upper and lower arms 131, 132. The right and left rear cushion units 134 are each supported between each lower arm 132 and the sub-frame assembly 140.

Figure 10:
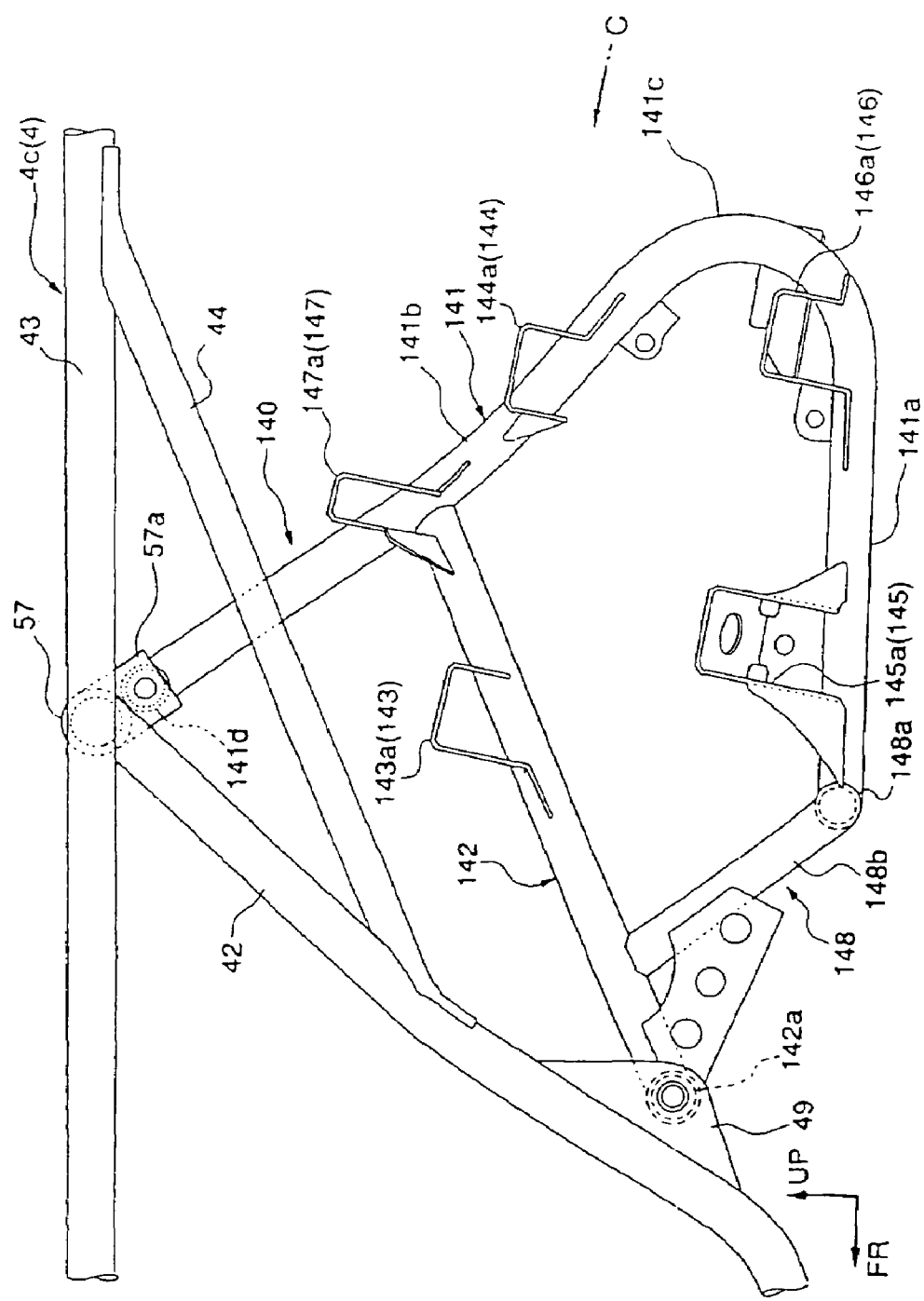
FIG. 10 is a side view of a sub-frame assembly for the independent suspension type rear suspension.
Figure 11:
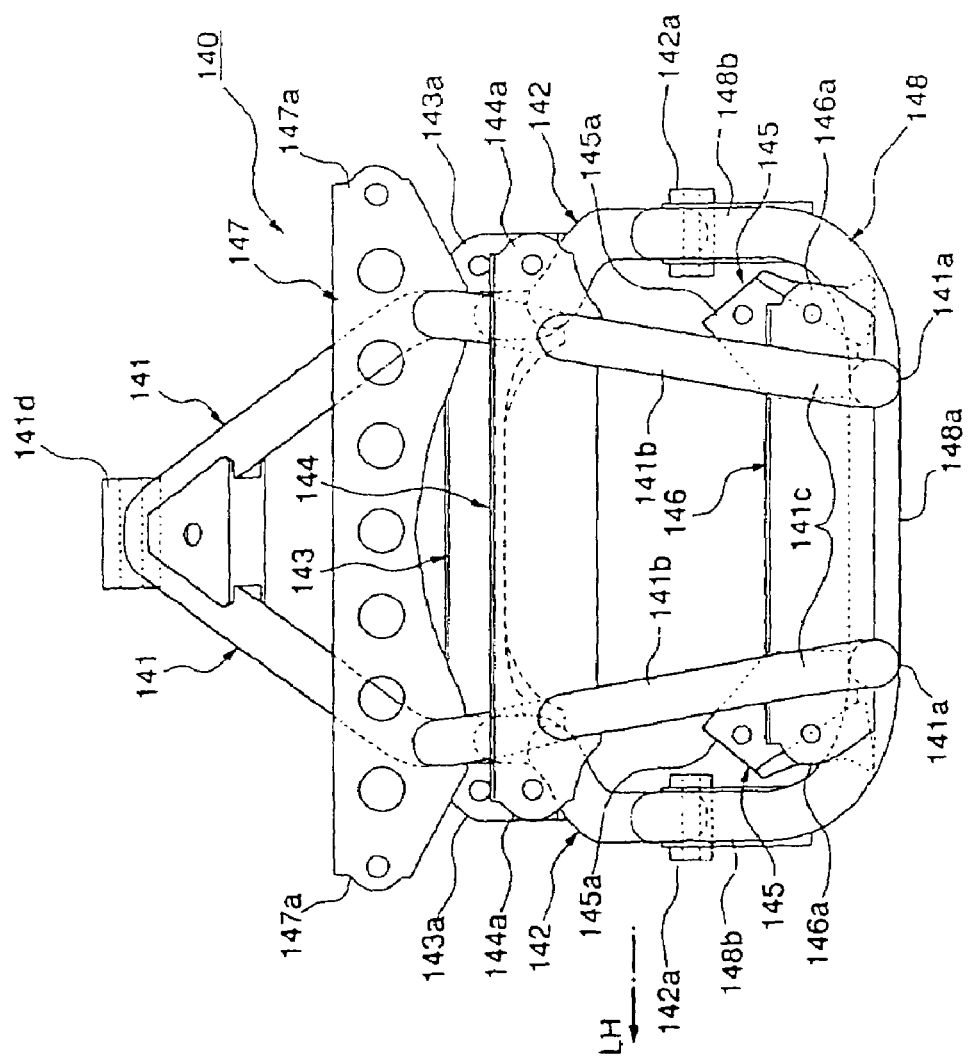
FIG. 11 is a view as seen in the direction of arrow C in FIG. 10.
Figure 12:
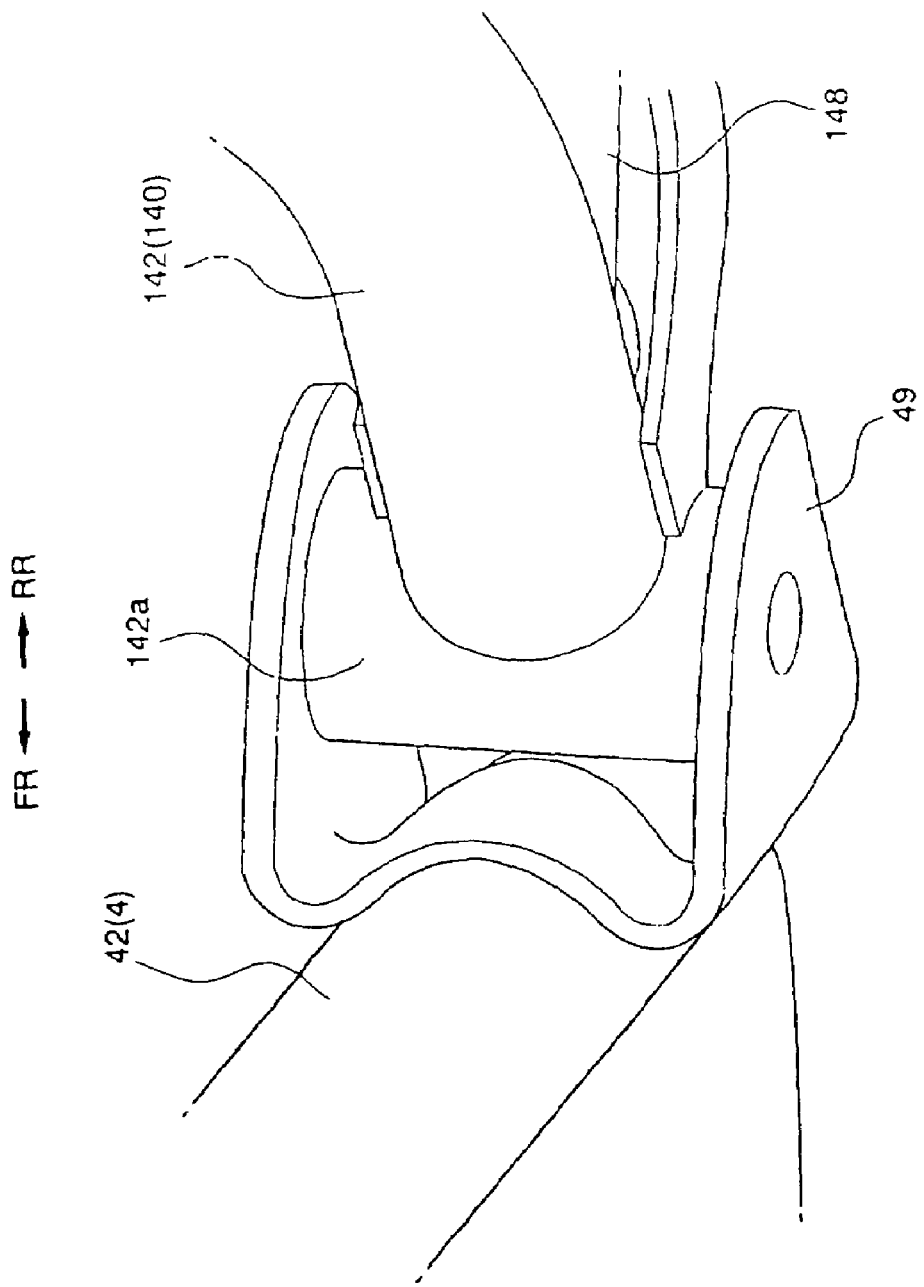
FIG. 12 is a perspective view showing a joined portion between a pivot connection and a pivot bracket.

Referring also to FIGS. 10 and 11, the sub-frame assembly 140 includes right and left rear cushion pipes 141, a rear cushion lower pipe 148, right and left rear cushion sub-pipes 142, and plural cross beams 143, 144, 146, and 147. The right and left rear cushion pipes 141 are curved so as to be open forward in side view of the vehicle body. The rear cushion lower pipe 148 is mounted bridgewise between lower ends of the rear cushion pipes 141 and whose both sides are curved obliquely upward and forward. The right and left rear cushion sub-pipes 142 are mounted bridgewise between both curved ends of the rear cushion lower pipe 148 and upper portions of the rear cushion pipes 141. The plural cross beams 143, 144, 146, and 147 are mounted bridgewise between the rear cushion pipes 141 and the rear cushion sub-pipes 142. These pipes and beams are joined together by welding for example. The sub-frame assembly 140 thus constructed is disposed substantially symmetrically right and left with respect to the center in the transverse direction of the vehicle body and the greater part thereof is positioned between both rear wheels.

Each rear cushion pipe 141 includes, in side view of the vehicle body, a lower horizontal portion 141a disposed nearly horizontally at a lower position than a hub portion 3a of each rear wheel 3, an upper inclined portion 141b inclined forwardly upward at a position higher than the hub portion 3a, and a backwardly projected arcuate portion 141c which connects rear ends of the lower horizontal portion 141a and the upper inclined portion 141b with each other at a position rearer than the hub portion. These constituent portions are formed integrally by bending a single steel pipe.

The rear cushion lower pipe 148 includes a transversely extending lower horizontal portion 148a and curved portions 148b located right and left of the lower horizontal portion 148a. These constituent portions are formed integrally by bending a single steel pipe. The lower ends of the rear cushion pipes 141 are joined to near both ends of the lower horizontal portion 148a of the rear cushion lower pipe 148.

Each rear cushion sub-pipe 142 is disposed so as to be inclined forwardly downward in side view of the vehicle body and it is formed in a crank shape by bending a single steep pipe in such a manner that its front portion is positioned to a transversely outer position with respect to its rear portion. Both curved ends of the rear cushion lower pipe 148 are joined to near front ends of the rear cushion sub-pipes 142, while rear ends of the rear cushion sub-pipes 142 are joined to nearly central positions in the longitudinal direction of the upper inclined portions 141b of the rear cushion pipes 141.

Transversely extending upper central cross beam 147 and middle rear cross beam 144 are mounted bridgewise between the upper inclined portions 141b of the rear cushion pipes 141. Likewise, a lower rear cross beam 146 is mounted bridgewise between the lower horizontal portions 141a of the rear cushion pipes 141, and a middle front cross beam 143 is mounted bridgewise between the rear cushion sub-pipes 142.

The upper inclined portion 141b of each rear cushion pipe 141 is provided so as to be curved in the vicinity of its portion joined to the associated rear cushion sub-pipe 142 and so that its portion higher than the joined portion is inclined inwards in the transverse direction. Front ends of the upper inclined portions 141b of the rear cushion pipes 141 are combined and joined together nearly centrally in the transverse direction, and integral therewith is a short pipe-like upper central connection 141d extending transversely so as to straddle the front ends of the upper inclined portions 141b.

Further, transversely extending short pipe-like right and left pivot connections 142a are integrally provided respectively at the front ends of the rear cushion sub-pipes 142.

As shown in FIGS. 8 and 10, each pivot connection 142a is clamped to the pivot bracket 49 located on the same side in the body frame 4, using a bolt extending through those components to be clamped and a nut. The upper central connection 141d is clamped to the upper mount 57a using a bolt extending through those components to be clamped and a nut.

A description will now be given about the portion where each pivot connection 142a and the associated pivot bracket 49 are joined together. Each pivot bracket 49 includes a pair of plate members opposed to each other in the transverse direction. In a state in which the pivot connection 142a has entered between the plate members, both are clamped together using bolt and nut in the transverse direction. The joined portion between the upper mount 57a and the upper central connection 141d also has the same construction and therefore an explanation thereof will be omitted.

Thus, using the pivot brackets 49 and the upper mount 57a, the sub-frame assembly 140 is integrally mounted to the body frame 4.

The upper arms 131 and lower arms 132 are in a generally V shape branching from knuckles 133 side (front end side) toward the sub-frame assembly 140 side (base end side) in top view thereof. At the branch ends there are integrally provided short pipe-like frame connections 131a and 132a which are inclined backwardly downward. The frame connections 131a and 132a are provided mutually in parallel so as to each share a central axis with each of the upper arms 131 and lower arms 132.

Arm connections 143a and 144a corresponding to the front and rear frame connections 131a of the upper arms 131 are provided respectively at both sides of the middle front and rear cross beams 143, 144. Arm connections 146a corresponding to the rear frame connections 132a of the lower arms 132 are provided at both sides of the lower rear cross beam 146. Further, lower front support brackets 145, which constitute arm connections 145a corresponding to the front frame connections 132a of the lower arms 132, are provided in the upper inclined portions 141b of the rear cushion pipes 141.

To the arm connections 143a to 146a are connected the frame connections 131a and 132a of the corresponding upper arms 131 and lower arms 132 with use of pivot shafts (e.g., shoulder bolts) extending through those connections along the foregoing central axis. In this state, the frame connections 131a and 132a are supported by the arm connections 143a to 146a pivotably through the pivot shafts and bearings disposed on outer peripheries of the pivot shafts. That is, the upper frames 131 and the lower frames 132 are pivotably supported by the sub-frame assembly 140.

Backwardly inclined short pipe-like knuckle connections 131b and 132b are integrally provided at the front ends of the upper arms 131 and lower arms 132 so as to be parallel with the frame connections 131a and 132a. On the other hand, knuckle connections 133a corresponding to the knuckle connections 131b and 132b of the upper arms 131 and lower arms 132 are provided in upper and lower portions of the knuckles 133.

To the knuckle-side arm connections 133a are connected the knuckle connections 131b and 132b of the corresponding upper arms 131 and lower arms 132 with use of connecting shafts (e.g., shoulder bolts) extending through those connections in parallel with the foregoing central axis. In this state, the knuckle-side arm connections 133a, i.e., knuckles 133, are supported by the knuckle connections 131b and 132b, i.e., upper arms 131 and lower arms 132, through the connecting shafts and bearings disposed on outer peripheries of the shafts.

Upwardly projecting arm-side mounts 132c are provided in front portions of the lower arms 132. To the arm-side mounts 132c are connected lower ends of the corresponding rear cushion units 134 with use of connecting shafts (e.g., shoulder bolts) extending through those connected portions in parallel with the foregoing central axis. In this state, the lower ends of the rear cushion units 134 are supported by the arm-side mounts 132c, i.e., lower arms 132, through bearings installed within the lower ends and the connecting shafts.

Frame-side mounts 147a are provided at both side portions of the upper central cross beam 147. To the frame-side mounts 147a are connected upper ends of the corresponding rear cushion units 134 with use of connecting shafts (e.g., shoulder bolts) extending through those connected portions in parallel with the foregoing central axis. In this state, the upper ends of the rear cushion units 134 are supported by the frame-side mounts 147a, i.e., body frame 4, through bearings installed within the upper ends and the connecting shafts.

In this construction, when an impact load or the like is inputted to the rear wheels 3 from the road surface, the rear wheels pivot up and down each independently through the corresponding upper arms 131 and lower arms 132, causing the rear cushion units 134 to expand and contract, and the load is absorbed gently by a buffer action of the rear cushion units 134.

A casing 135a of a rear final reduction gear unit 135 is integrally joined to a rear portion of the sub-frame assembly 140 (more particularly, a rear portion of the left rear cushion pipe 141) with use of bolts or the like. The rear final reduction gear unit 135 is provided in such a manner that an input portion 135b thereof is positioned nearly centrally in the transverse direction of the vehicle body, and the rear end of the rear drive shaft 12 is connected to the input portion 135b through a universal joint (not shown). The rear drive shaft 12 is disposed inclinedly so as to extend bridgewise between the rear end of the rear output shaft 9, which is offset to the left side of the vehicle body, and the input portion 135*b* of the rear final reduction gear unit 135, which is positioned nearly centrally in the transverse direction of the vehicle body. A brake disc of a rear wheel brake is coaxially fixed to the rear drive shaft 12 at a position close to the rear final reduction gear unit 135.

Right and left inner universal joints 136*a* are disposed outside and sideways of the rear final reduction gear unit 135 and connecting rods extending from the inner universal joints 136*a* are connected respectively to right and left output portions 135*c* of the rear final reduction gear unit 135. On the other hand, right and left outer universal joints 136*b* are disposed inside and sideways of the knuckles 133 and connecting rods extending from the outer universal joints 136*b* are connected respectively to the hub portions 3*a* of the rear wheels 3.

Right and left drive shafts 136 are mounted bridgewise between the inner universal joints 136*a* and the outer universal joints 136*b*. More specifically, an inner end of each drive shaft 136 is connected to the associated output portion 135*c* of the rear final reduction gear unit 135 through the associated inner universal joint 136*a*, while an outer end thereof is connected to the hub portion 3*a* of each rear wheel 3 through the associated outer universal joint 136*b*.

The driving force of the engine 5 outputted to the rear output shaft 9 is transmitted to the rear wheels 3 through the universal joint 12*a*, rear drive shaft 12, rear final reduction gear unit 135, inner universal joints 136*a*, drive shafts 136, and outer universal joints 136*b*.

In the frame structure according to the above embodiment, as described above, the body frame 4 includes the front portion 4*a*, which suspend the front wheels 2, the center portion, which supports the engine 5, and the rear portion 4*c* serving also as a seat rail. The swing arm 71, which suspends the rear wheels 3, is supported in the center portion 4*b*, and the rear cushion unit 72 is supported in the center portion 4*b* or the rear portion 4*c*. The sub-frame assembly 140 for the independent suspension type rear suspension 130 can be mounted to the body frame 4 by utilizing the pivot brackets 49 provided in the center portion 4*b* and the upper mount 57*a* provided on the rear cross pipe 57.

According to this construction, the body frame 4 in the saddle-ride four-wheeled vehicle 1, which adopts the swing arm type rear suspension 70, is also applicable to the case where the saddle-ride four-wheeled vehicle 1 adopts the independent suspension type rear suspension 130. That is, the body frame 4 can be used in common to even vehicles different in the rear suspension type, whereby the cost of the body frame 4 and hence of the saddle-ride four-wheeled vehicle 1 can be greatly reduced.

In this connection, the sub-frame assembly 140 is provided with the frame-side mounts 147*a* as cushion mounting portions for the independent suspension type rear suspension 130, whereby it is no longer required to provide parts for the independent suspension type rear suspension 130 beforehand in the body frame 4 and therefore it is possible to prevent the occurrence of surplus parts when the body frame 4 is applied to a saddle-ride four-wheeled vehicle of a different suspension type.

Figure 13:
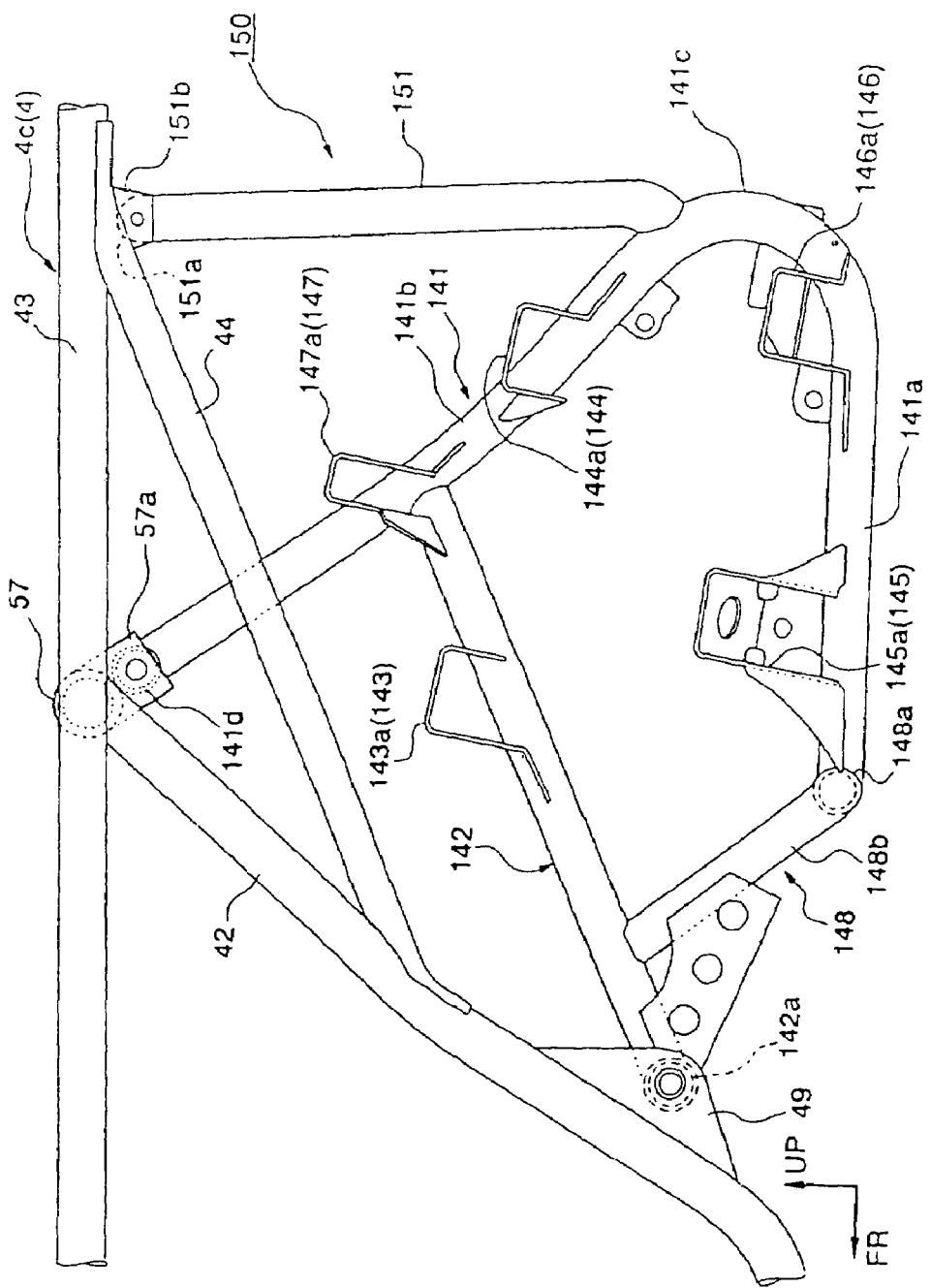
FIG. 13 is a side view showing a modification of the sub-frame assembly.

The present invention is not limited to the above embodiment, but for example a sub-frame assembly 150 shown in FIG. 13 may be used.

More specifically, the following construction may be adopted. A support pipe 151 is extended upward from a rear end (near an arcuate portion 141*c*) of each rear cushion pipe 141 and an upper connection 151*a* is provided at an upper end of the support pipe 151, while a sub-mount 151*b* corresponding to the upper connection 151*a* is provided near the joined portion between each rear upper pipe 43 and the associated rear sub-pipe 44 in the body frame 4, and the side-mount 151*b* and the upper connection 151*a* are connected together using a bolt or the like. The side mount 151*b* and the upper connection 151*a* are located at a transversely outer position relative to the upper mount 57*a*. In FIG. 13, the same portions as in the above embodiment are identified by the same reference numerals as in the above embodiment and explanations thereof are here omitted.

Thus, by providing each side mount 151*b* for supporting the sub-frame assembly 150 at a position different from the positions of each pivot bracket 49 and upper mount 57*a* in the body frame 4, not only the function and effect obtained in the above embodiment can be obtained, but also it is possible to enhance the mounting rigidity of the sub-frame assembly 150 relative to the body frame 4 and hence the rigidity of the rear suspension 130.

In this case, since the side mount 151*b* for supporting the sub-frame assembly 150 is provided at a transversely outer position relative to the upper mount 57*a* in the body frame 4, the sub-frame assembly 150 can be mounted stably even in the case where the upper mount 57*a* for the swing arm type rear suspension 70 is provided nearly centrally in the transverse direction of the vehicle body.

It goes without saying that the construction of the above embodiment is a mere example and the application thereof is not limited to saddle-ride four-wheeled vehicles and that various changes may be made within the scope not departing from the gist of the present invention.

What is claimed is:

1. A frame structure in a saddle-ride vehicle, comprising:
   a body frame, said body frame including
   a front portion for suspending a front wheel,
   a center portion for supporting an engine, and
   a rear portion serving also as a seat rail, with a swing arm, which suspends at least two rear wheels being supported in said center portion, and with a rear cushion being supported in said center portion or said rear portion,
   wherein a sub-frame for an independent rear suspension is attached to said body frame by utilizing a swing arm support portion provided in said center portion and a rear cushion support portion provided in said center portion or said rear portion.

2. The frame structure according to claim 1, wherein said sub-frame has a cushion mounting portion for an independent rear cushion.

3. The frame structure according to claim 2, wherein a support portion for said sub-frame is provided in a portion of said body frame different from said swing arm support portion and said rear cushion support portion.

4. The frame structure according to claim 3, wherein said support portion for said sub-frame is provided in a portion of said body frame located at a transversely outer position with respect to said rear cushion support portion.

5. The frame structure according to claim 2, wherein the cushion mounting portion is a frame side mount on the sub-frame.

6. The frame structure according to claim 1, wherein a support portion for said sub-frame is provided in a portion of said body frame different from said swing arm support portion and said rear cushion support portion.

7. The frame structure according to claim 6, wherein said support portion for said sub-frame is provided in a portion of said body frame located at a transversely outer position with respect to said rear cushion support portion.

8. The frame structure according to claim 6, wherein said sub-frame includes a support pipe extending upward from rear end of the sub-frame,
wherein an upper end of the support pipe is connected to the support portion of the seat rail.

9. The frame structure according to claim 1, the sub-frame assembly includes right and left rear cushion pipes, a rear cushion lower pipe, right and left rear cushion sub-pipes, and plural cross beams.

10. The frame structure according to claim 1, wherein the swing arm support portion is a pivot bracket and the rear cushion support portion is an upper mount.

11. A frame structure in a saddle-ride vehicle, comprising:
a body frame, said body frame including
a center portion for supporting an engine, and
a rear portion serving also as a seat rail, with a swing arm, which suspends at least two rear wheels being supported in said center portion, and with a rear cushion being supported in said center portion or said rear portion,
wherein a sub-frame for an independent rear suspension is attached to said body frame by utilizing a swing arm support portion provided in said center portion and a rear cushion support portion provided in said center portion or said rear portion, and
wherein a rear portion of the sub-frame surrounds a rear final reduction gear.

12. The frame structure according to claim 11, wherein said sub-frame has a cushion mounting portion for an independent rear cushion.

13. The frame structure according to claim 12, wherein a support portion for said sub-frame is provided in a portion of said body frame different from said swing arm support portion and said rear cushion support portion.

14. The frame structure according to claim 13, wherein said support portion for said sub-frame is provided in a portion of said body frame located at a transversely outer position with respect to said rear cushion support portion.

15. The frame structure according claim 12, wherein the cushion mounting portion is a frame side mount on the sub-frame.

16. The frame structure according to claim 11, wherein a support portion for said sub-frame is provided in a portion of said body frame different from said swing arm support portion and said rear cushion support portion.

17. The frame structure according to claim 16, wherein said support portion for said sub-frame is provided in a portion of said body frame located at a transversely outer position with respect to said rear cushion support portion.

18. The frame structure according to claim 16, wherein said sub-frame includes a support pipe extending upward from rear end of the sub-frame,
wherein an upper end of the support pipe is connected to the support portion of the seat rail.

19. The frame structure according to claim 11, the sub-frame assembly includes right and left rear cushion pipes, a rear cushion lower pipe, right and left rear cushion sub-pipes, and plural cross beams.

20. The frame structure according to claim 11, wherein the swing arm support portion is a pivot bracket and the rear cushion support portion is an upper mount.

* * * * *